United States Patent [19]

Papayoanou

[11] 4,241,319
[45] Dec. 23, 1980

[54] DUAL CHANNEL WAVEGUIDE GAS LASER

[75] Inventor: Aristotle Papayoanou, Eatontown, N.J.

[73] Assignee: The United States of America as represented by the Secretary of the Army, Washington, D.C.

[21] Appl. No.: 12,675

[22] Filed: Feb. 16, 1979

[51] Int. Cl.³ .............................................. H01S 3/10
[52] U.S. Cl. .......................... 331/94.5 G; 331/94.5 C; 350/96.19
[58] Field of Search ............. 331/94.5 G, 94.5 D, 331/94.5 M, 94.5 K, 94.5 C; 350/96.19

[56] References Cited

U.S. PATENT DOCUMENTS

| | | | |
|---|---|---|---|
| 3,806,834 | 4/1974 | Johnston et al. | 331/94.5 M |
| 3,970,963 | 7/1976 | Chester | 331/94.5 C |
| 4,085,387 | 4/1978 | Asawa et al. | 331/94.5 M |
| 4,103,255 | 7/1978 | Schlossberg | 331/94.5 G |
| 4,129,836 | 12/1978 | Papayoanon | 331/94.5 D |
| 4,174,504 | 11/1979 | Chenausky et al. | 331/94.5 Q |
| 4,176,327 | 11/1979 | Wayne et al. | 331/94.5 C |

*Primary Examiner*—William L. Sikes
*Assistant Examiner*—León Scott, Jr.
*Attorney, Agent, or Firm*—Nathan Edelberg; Jeremiah G. Murray; Daniel D. Sharp

[57] ABSTRACT

Disclosed is a pair of channel waveguide $CO_2$ lasers formed in a common ceramic block. Both discharge channels are DC excited for CW operation and share common mirrors at both ends. The laser cavity includes a Stark cell coupled via a window to one end of both discharge cannels and contains ammonia or deuterated ammonia. The Stark cell is further truncated by a grating opposite the window to provide an overall three mirror cavity configuration which permits predetermined laser line selection. The Stark cell, moreover, is configured to include two pairs of electrodes which permit independent voltage modulation of the two $CO_2$ laser beams.

10 Claims, 6 Drawing Figures

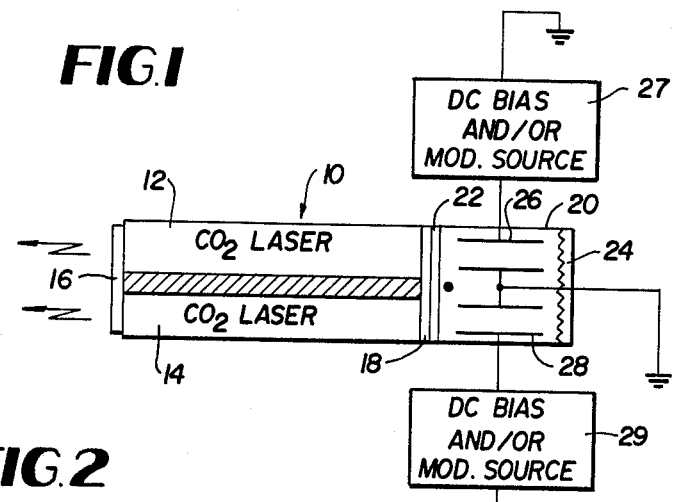
FIG.1
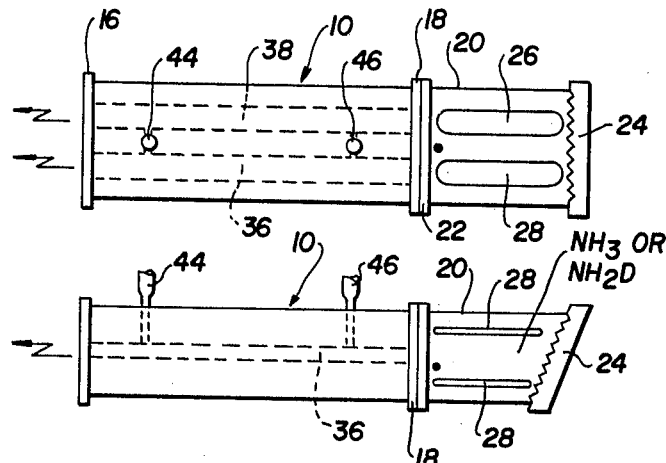
FIG.2
FIG.3
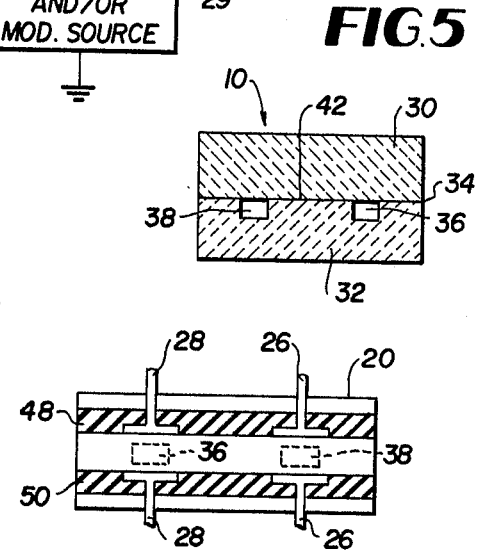
FIG.5
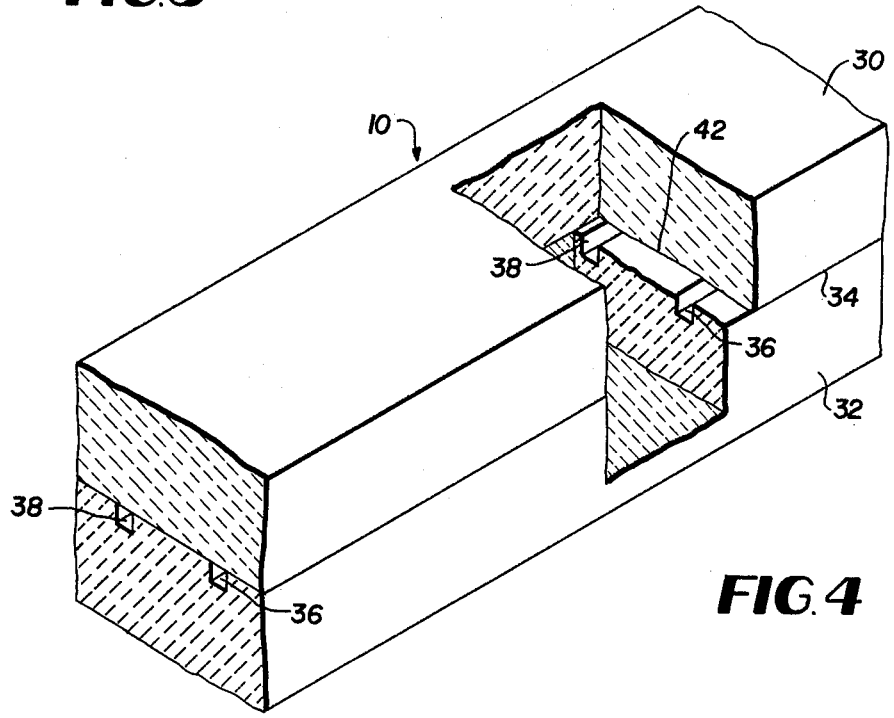
FIG.6
FIG.4

DUAL CHANNEL WAVEGUIDE GAS LASER

The invention disclosed herein may be manufactured and used by or for the U.S. Government for governmental purposes without the payment of any royalties thereon or therefor.

BACKGROUND OF THE INVENTION

1. Field of the Invention

This invention relates generally to gas laser technology and more particularly to gas lasers whose discharge channels are formed in ceramic waveguide.

2. DESCRIPTION OF THE PRIOR ART

It is well known that discharges and small bore tubes using gases with homogeneously broadened laser transitions obtainable with mixtures of $CO_2$, CO and $N_2O$ permit operation at higher pressures. Pressure broadened optical gain lines are desirable inasmuch as they allow wider frequency tuning of a laser oscillator and they allow small amplitude variations when operating over a relatively wide range of frequencies near gain line center. It is also known that optimum pressures for laser action in wall dominated discharges are inversely proportional to the bore diameter. This makes it desirable to build laser tubes with samll bores or channels; however, in constructing such laser systems for optimum operation, certain problems are encountered. First of all, diffraction of the optical beam from the "guide" can lead to large diffractional losses unless curved mirrors are precisely positioned from the guide end to minimize these losses. Alternatively, flat mirrors which terminate the guide end reduce such diffraction losses to nearly zero while greatly improving mechanical stability by making the mirrors integral parts of the optical gain chamber. Secondly, small bores or channels introduce optical absorption losses and losses due to scattering from the wall surfaces. Thirdly, operation of small bore tubes reduces the wall surface area available for conductive wall cooling of the gaseous discharge. Noting that the optimum pressure is inversely proportional to the bore diameter while the area of the tube varies as the square of the wall diameter, the reduction of the heat transfer area makes heat removal a more serious problem, assuming that the electrical input power per unit length remains constant as the tubes are scaled to smaller diameters.

In U.S. Pat. No. 4,129,836, entitled "Frequency Stable Boron Nitride Channel Laser", which issued to the subject inventor on Dec. 12, 1978, and assigned to the present assignee, there is disclosed a ceramic waveguide gas laser wherein the waveguide consists of boron nitride and more particularly comprises two equal lengths of boron nitride contiguously placed together with one of the lengths including a longitudinal or lengthwise channel formed therein with the contiguous surface of the other length providing the fourth wall of a rectangular laser cavity together with flat mirrors secured to the opposite ends of the slabs. Two or more gas ports including electrode means are coupled to the channel through the boron nitride walls. Such a gas laser constructed from boron nitride which due to its high thermal conductivity and extremely low thermal expansivity, provides an improvement in frequency stability over heretofore known apparatus.

Efforts to modulate laser beams and more particularly to gas lasers, is also well knwon. In U.S. Pat. No. 3,806,834, for example, there is disclosed the concept of Stark effect modulation of $CO_2$ lasers with deuterated ammonia ($NH_2D$). As disclosed therein, a modulating field can be superimposed on a DC bias voltage to achieve amplitude modulation of the laser beam.

Currently, gas lasers performing interrelated functions operate independently. For example, a local oscillator CW laser is separately constructed from a pulsed laser. This requires continuous sensing of the frequency difference of the two lasers and correction for frequency drifting by using a feedback circuit which makes incremental cavity length changes by applying a voltage to piezoelectric crystals or bimorphs. Additionally, each laser requires a separate set of optics. The independent thermal and mechanical motion of the laser cavities and gratings causes a continuous random drifting of the two laser frequencies with respect to one another.

SUMMARY

The present invention is directed to an improvement in gas laser technology where two lasers having a high frequency coincidence or fixed frequency offset is required. The subject improvement consists in combining two channel waveguide $CO_2$ lasers within a common ceramic block while sharing common optics and operating on the identical vibrational rotational laser transition and at the same frequency. A Stark effect cell containing ammonia or deuterated ammonia is coupled to the common optics and includes two pairs of electrodes for biasing and/or modulating each laser beam input independently. One side of the Stark cell terminates in a tilted grating which is adapted to be in the path of the two laser beams and permits line selection of the laser beam outputs.

BRIEF DESCRIPTION OF THE DRAWINGS

FIG. 1 is a schematic illustration of the preferred embodiment of the subject invention;

FIG. 2 is a diagram broadly illustrative of the top plan view of a gas laser constructed in accordance with the subject invention;

FIG. 3 is an illustration of the side view of the configuration shown in FIG. 2;

FIG. 4 is a fragmentary perspective view including a cutaway section of a common ceramic block structure in which two discharge channels are formed;

FIG. 5 is illustrative of a transverse cross section of the ceramic block structure shown in FIG. 4; and FIG. 6 is illustrative of a transverse cross section of the Stark cell configuration shown in FIG. 1.

DESCRIPTION OF THE PREFERRED EMBODIMENT

Referring now to the drawings and first to FIG. 1, reference numeral 10 is intended to designate an elongated ceramic structure as disclosed in FIG. 4 comprised of boron nitride, beryllium oxide, or alumina, for example, within which is formed two identical gas ($CO_2$) lasers 12 and 14 consisting of channel waveguide lasers having common front and rear mirrors 16 and 18 affixed thereto and which are adapted to be perpendicularly aligned to the respective laser beams in a manner well known to those skilled in the art. The front or output mirror 16 is adapted to have a relatively high transmisivity, for example 8%, while the rear or end mirror 18 is adapted to have a low reflectivity, for example 75%.

Adjacent the end mirror 18 is a Stark cell 20 filled with ammonia ($NH_3$) or deuterated ammonia ($NH_2D$) gas. The Stark cell includes a window 22 and is truncated at its opposite end by a grating 24. The grating is opposite from the window 22 and is slanted or tilted relative thereto so that pre-selection of desired $CO_2$ laser lines can be effected. Intermediate the window 22 and the grating 24 are two pairs of plate-type electrodes 26 and 28 as shown in FIG. 6, for example, which are adapted to be placed parallel to straddle the respective laser beams formed in the lasers 12 and 14 and which are adapted to pass through the rear mirror 18 and the window 22 as shown schematically in FIGS. 2 and 3. As thus configured, the entire laser cavity includes the front mirror 16, the gas discharge section 12 or 14, end mirror 18, Stark cell 20 and grating 24. The rear mirror configuration of the laser cavity may be considered to effectively be comprised of the end mirror 18 and grating 24 acting in tandem and giving the appearance of a single end mirror to both lasers.

FIGS. 2 and 3 are intended to further schematically illustrate the construction of two $CO_2$ lasers in a single compact rugged package. These lasers share common optics, a common Stark gas, a common path lengths but separately controllable Stark cell electrodes.

Referring now to FIGS. 4 and 5, the ceramic block 10 from which the two laser discharge channels are formed is comprised of two equal lengths of like ceramic material 30 and 32 e.g. boron nitride, beryllium oxide or alumina, which are contiguously bonded together to share a common flat interface 34. Prior to joining the two members 30 and 32 together, a pair of identical parallel rectangularly shaped channels 36 and 38, typically 2.0 mm ±0.5 mm in width, are machined in the upper surface of the member 32 along its entire length. Upon bonding the upper member 30 to the lower member 32, the lower surface 42 forms the fourth or upper wall of the channels 34 and 36. A similar configuration for a single discharge channel is disclosed in the aforementioned U.S. Pat. No. 4,129,836. Both channels 36 and 38 as shown in FIGS. 4 and 5 are adapted to be DC excited for CW operation by the coupling thereto of suitable electrodes and gas filled/gas ballast elements 44 and 46.

Referring now to FIG. 6, there is shown the physical relationship of the dual channel waveguides 36 and 38 and the pairs of electrodes 26 and 28 which are adapted to be coupled to respective bias and/or modulation signal sources 27 and 29 shown in FIG. 1. Reference numerals 48 and 50 designate insulative members for positioning the electrodes 26 and 28 inside of the Stark cell cavity 20.

Accordingly, as shown in block diagrammatic form in FIG. 1, each pair of electrodes is adapted to receive its respective DC bias potential and any modulating voltage desired which can be independently applied whereupon the two $CO_2$ lasers in the adjoining parallel waveguide channels 36 and 38 can when desirable be operated in different modes. For example, one laser can be modulated for pulsed operation, whereas the second may be operated in the CW mode with the Stark cell 20 being used only for occasional frequency tuning. The two $CO_2$ lasers are adapted to operate on the identical vibrational rotational laser transition by means of the common grating 24 which allows the operator to selectively operate on those $CO_2$ laser lines which are in near coincidence with the absorption lines of $NH_3$ or $NH_2D$. To achieve complete wavelength (frequency) coincidence of the Stark cell gas with the desired $CO_2$ laser line a predetermined DC bias voltage is applied to the Stark cell electrodes from the sources 27 and 29. In addition they can operate at the same frequency or a predetermined frequency offset which is achieved by the respective pair of STark cell electrodes associated with each discharge channel. This type of configuration overcomes the independent thermal and mechanical motion problems of conventional lasers operated independently and separately constructed from one another. Also, the common optical reflecting components 16, 18 and 24 greatly reduce the continuous random drifting of two laser frequencies relative to one another.

It should also be noted that the cavity formed by the grating 24 and the laser rear mirror 18 constitutes a two mirror Fabry Perot interferometer. The Stark cell 20 occupies the space between the grating 24 and this laser rear mirror 18. Operation of the $CO_2$ lasers 12 and 14 on an absorption line of the Stark cell gas allows one to control both the frequency and the mode of operation, e.g. pulsed, of the dual mode laser configuration. Small voltage variations applied to the Stark cell electrodes 26 and 28 allow one to vary the gaseous refractive index. Such changes of the Stark cell refractive index can cause large reflectivity changes of the Fabry Perot resonator. Thus a small voltage variation, typically about 10 volts, "tunes" the Fabry Perot refractive index sufficiently to shift the overall resonant frequency of the respective laser cavity. This shift is directly translated into a small laser frequency shift.

Larger Stark cell voltages cause larger changes of the Fabry Perot reflectivity. Thus one can easily change the effective reflectivity of the Stark cell Fabry Perot from a large value (95% to 99% typically) to a small value (5% to 10%). For the separation of the Stark cell electrodes 26 and 28 corresponding to the waveguide laser, 2.0 mm ±0.5 mm, such voltages are in the range of 100 to 300 volts. In this case the laser is being pulsed on and off in step with the voltage induced reflectivity changes. Consequently, with two separate sets of Stark cell electrodes 26 and 28 one can separately control the mode of operation of the two lasers 12 and 14. Since the lasers share the same optical components and virtually identical optical path lengths the frequency excursions due to macroscopically induced frequency variations i.e. mechanical vibrations, thermal cavity length changes, are identical. Thus, to first order of approximation these naturally occurring laser frequency "drifts" are not independently random but should be identical for both lasers 12 and 14.

Accordingly, operation of the Stark cell Fabry Perot interferometer thus configured works by changing the effective refractive index of the Stark cell and hence the resonant frequency of this Fabry Perot and the entire laser cavity. In this mode of operation, the overall losses introduced into the laser cavity by the wavelength selective grating 24 are small, 1 to 3%. Thus wavelength selectivity is efficiently achieved despite diffraction losses of the laser beams from the respective waveguides 36 and 38.

In summary, the Fabry Perot two mirror cavity formed by the laser end mirror 18 and the grating 24 allows efficient, easy wavelength tuning of the laser cavity to the desired $CO_2$ laser wavelength. By introducing a Stark cell and Stark cell electrodes in the space formed by the end mirror 18 and grating 24 and operating the laser on an absorption line of the Stark cell gas one can make small changes of the laser frequency by small variations of the Stark cell voltage. Additionally, one can operate the laser in the pulsed mode of operation by applying larger voltages to the Stark cell electrodes.

Also by proper choice of the laser end mirror reflectivity, approximately 75% to 85%, one greatly reduces the circulating laser power in the Stark cell 20 thereby preventing "saturation" of the Stark cell gas.

Pulsing of one of the two lasers of this dual mode laser can be accomplished at high repetition frequencies, up to 100 KHz, for a number of reasons. The first is that the voltages and powers required for the closely spaced Stark cell electrodes 26 and 28 are modest so that high repetition rate operation of the voltage modulator is readily achievable. The second reason is that the response time of the Stark cell gas $NH_3$ or $NH_2D$ is much faster than other voltage modulating times or laser response times so this gas cell does not establish limitations on the pulsing rate. The third reason is that the optimum gas pressure of the laser discharge when a waveguide laser is used is relatively high, about 100 Torr. The repumping otime of the laser is then short and laser action is achievable a short interval after a previous laser pulse emission.

For sensitive coherent detection systems, the dual laser system thus shown and described is extremely useful. For example, the long term frequency coincidence of the two lasers permits one to use the CW laser as a local oscillator. If the other laser is pulsed, it can be used for coherent range determination. In addition, velocity information can be derived from shorter ranged targets by mixing the CW laser with its own Doppler shifted return signal on a detector. This unitary dual mode laser system thus can provide both range and velocity information. Laser radar systems which use coherent detection techniques as well as coherent imaging systems are particularly adapted to use a dual mode laser transmitter constructed in accordance with the subject invention. In the case of coherent imaging systems, the higher peak power of the pulse modulated laser results in extended range capability. In addition, such systems have target range and velocity capability.

What is significant about the subject dual laser configuration is that once the CW and pulsed laser, for example, are brought into frequency coincidence, little or no change is required to maintain its coincidence over the period of its period of its intended use. In this respect, one should recognize that frequency coincidence of the two lasers need not be maintained to better than two or three MHz, since the short pulses of the laser used for ranging require detection bandwidths of about 10 MHz.

Thus what has been shown and described is an improved compact mechanically and thermally stable pair of frequency tunable lasers formed in a common ceramic member having extremely low thermal expansivity which is precisely and equally machinable to provide a pair of discharge channels having walls of sufficient straightness and smoothness to maintain efficient stable laser operation. The lasers also share common optical components, mirrors, grating as well as a common Stark gas and virtually identical optical path lengths.

Having thus shown and described what is at present considered to be the preferred embodiment of the subject invention,

I claim:

1. In a tunable high pressure gaseous molecular laser, the combination of:
   a laser cavity structure having a pair of elongated dielectric waveguide laser cavities of relatively small cross sectional area relative to their length, formed in said structure so as to have respective end terminations adjacent one another at the same opposite ends of said structure;
   first and second partially reflecting end mirrors respectively attached to said opposite ends forming common end mirrors for both said laser cavities;
   a laser medium comprising a gaseous mixture in both said laser cavities and including means for exciting said medium to generate respective laser beams;
   an external Stark cell positioned at one end of said cavity structure to receive simultaneously both said laser beams, said Stark cell being filled with gas and having a grating adapted to intercept said beams for permitting preselection of a predetermined laser line, said Stark cell being positioned between said one end and said grating and having two pairs of electrodes therein, said electrodes being positioned so that one electrode pair is adapted to effect the laser operation of one laser beam and the other electrode pair is adapted to effect laser operation of the other laser beam; and
   means coupled to said pairs of electrodes for applying electrical control voltages independently thereto for applying respective DC bias thereto and when desirable, a modulation voltage.

2. The laser as defined by claim 1 wherein said pair of laser cavities are formed in mutual parallel relationship in said structure.

3. The laser as defined by claim 1 wherein said cavity structure consists of ceramic material including boron nitride, beryllium oxide and alumina.

4. The laser as defined by claim 1 wherein said laser cavities are generally rectangular in cross section.

5. The laser as defined by claim 4 wherein said laser cavity structure consists of a first and a second contiguous piece of ceramic of equal length and having substantially flat end portions to which said respective end mirrors are attached.

6. The laser as defined by claim 1 wherein said laser medium comprises a gaseous mixture including carbon dioxide.

7. The laser as defined by claim 1 wherein said Stark effect cell includes a window which is located relative to one of said end mirrors to be in the path of both said laser beams.

8. The laser as defined by claim 1 wherein said Stark cells includes a window rigidly attached to one of said end mirrors and wherein said grating is angularly disposed and located opposite said window with said two pairs of electrodes being positioned therebetween.

9. The laser as defined by claim 8 wherein the gas in said Stark effect cell includes $NH_3$ or $NH_2D$.

10. The laser as defined by claim 1 wherein one of said first and second end mirrors has a relatively low reflectivity and wherein said Stark effect cell includes a window oriented relative to said mirror of relatively low reflectivity.

* * * * *